ns patent office
3,790,565
Patented Feb. 5, 1974

3,790,565
CEPHALOSPORIN C_A IMPROVED PROCESS
Peter W. Vanevenhoven, West Terre Haute, Ind., assignor to Eli Lilly and Company, Indianapolis, Ind.
No Drawing. Filed Aug. 23, 1971, Ser. No. 174,213
Int. Cl. C07d 99/24
U.S. Cl. 260—243 C
3 Claims

ABSTRACT OF THE DISCLOSURE

In a process for recovering cephalosporin $C_A$ type antibiotics obtained by the general nucleophilic displacement of the acetoxyl moiety of the crude cephalosporin C type starting compounds with the appropriate nucleophile in a heated, neutral aqueous solution of certain preferred halogen or —SCN salts, for example, in preparing cephaloridine from cephalothin, the product is nominally recovered in crude form by dilution and acidification to form the water-insoluble cephaloridine hydrothiocyanate salt. The claimed process improvement involves partial acidification wherein much of the colored, acidic degradation products are first converted to an insoluble, amorphous precipitate that is filtered prior to further acidifying the resulting filtrate, thereby permitting crystallization of an improved quality, lower-colored cephalosporin $C_A$ type hydrothiocyanate salt.

INTRODUCTION

This invention relates to processes for purifying and recovering cephalosporin $C_A$ antibiotic compounds from the reaction mixture in which they are prepared. More particularly, this invention provides economic and yield improvements in a process in which a water soluble cephalosporin $C_A$ antibiotic, e.g., cephaloridine, is precipitated as the insoluble cephaloridine hydrothiocyanate salt from its reaction mixtures.

BACKGROUND OF THE INVENTION

In U.S. Pat. No. 3,207,755, Abraham et al. disclose the terms cephalosporin C, cephalosporin $C_c$, and cephalosporin $C_A$. The cephalosporin $C_A$ compounds are said to be obtained by the treatment of cephalosporin C in aqueous solution with a weak, tertiary base, for example, pyridine, collidine or quinoline. If pyridine is used, the resultant antibiotic is referred to as cephalosporin $C_A$ (pyridine). That patent claims a process for cleaving cephalosporin C type compounds, and the cephalosporin C and cephalosporin $C_A$ (pyridine) nucleus and mineral acid salts thereof.

In U.S. Pat. No. 3,270,012 Higgins, Jr. discloses and claims an improvement in the process for preparing cephalosporin $C_A$ compounds which comprised carrying out the reaction between the 7-α-acylamidocephalosporanic acid with a pyridine in the aqueous medium in the presence of an at least equimolar proportion of thiocyanate or iodide ions.

U.S. Pat. No. 3,280,118 describes some N-(7-2'-thienylacetamidoceph-3-em-3-ylmethyl)pyridinium-4 _ carboxylate salts (cephalosporin $C_A$ compound salts) and a process for the purification of a crude aqueous solution of the cephaloridine betaine by contacting the cephaloridine solution with acid to form an acid addition salt of said betaine with said acid, and recovering the resulting salt, regenerating the betaine from the salt by contacting the salt in an aqueous medium with an anion exchange resin in the base form, an anion exchange resin in the weak acid form, or a tri(loweralkyl)amine, and recovering the betaine from the aqueous medium.

Higgins, Jr. et al. in U.S. Pat. No. 3,352,859 disclose and claim an improvement in the art of recrystallizing cephaloridine from an aqueous solvent by acetone dilution, wherein a mixed aqueous solvent for cephaloridine is used comprising methylene dichloride or chloroform or mixtures thereof to retard crystallization and methyl isobutyl ketone to improve the re-solution rate and color quality of the cephaloridine product. That patent also describes the general terms UV purity, color at 10 percent (O.D. at 410 mμ), $H_2O$, K.F., L.O.D., and the like.

Flynn U.S. Pat. No. 3,449,338 discloses and claims per se thienyl and furyl cephalosporin $C_A$ derivatives which are useful as antibiotics, among which is cephaloridine.

Jackson et al. U.S. Pat. No. 3,577,412 discloses an improvement in processes for removing cephalosporin $C_A$ antibiotics, e.g., cephaloridine, from concentrated, inorganic salt solutions thereof as the hydrothiocyanate salt using hydrochloric or sulfuric acid.

A combination of the above-described Higgins, Jr. patented method (U.S. Pat. No. 3,270,012), the Higgins, Jr. et al. patented improvement (U.S. Pat. No. 3,352,859), and the Jackson et al. improvement (U.S. Pat. No. 3,577,412) is now used to prepare cephaloridine from crude sodium cephalothin and pyridine. However, in adapting that improved process to plant manufacturing conditions, for economic reasons it is desirable to start the cephaloridine manufacturing operation with a crude alkali metal salt of cephalothin, e.g., sodium cephalothin, that is, sodium cephalothin which is still contaminated with undesired by-products and impurities which are carried through either from the cephalosporin C, the 7-aminocephalosporanic acid, or the thienylacetyl chloride, or other reactants or reaction mixture constituents in which the sodium cephalothin is made. Removal of the impurities which discolor the cephaloridine reaction mixture solutions is essential. Prior to this invention, those in the art, as reflected by the above patents, had isolated an impure cephaloridine hydrothiocyanate salt by direct acidification of the heated, diluted reaction mixture. Subsequent purification steps invariably involved an intermediate recrystallization of the insoluble salt or conversion to the water soluble betaine followed by an intermediate, somewhat difficult crystallization at low temperature from an aqueous concentrate. Those in the chemical antibiotic art continue to seek more efficient and economical methods for improving the yields, purity, and color quality of these valuable biologically active cephalosporin substances.

It is an object of this invention to provide an improved method for purifying and separating cephaloridine, and similar water soluble cephalosporin $C_A$ compounds, from the reaction mixtures containing them as hydrothiocyanate salts.

It is a more specific object of this invention to provide a process improvement which permits the elimination of an intermediate aqueous cephaloridine crystallization step from a process for preparing cephaloridine from hydrothiocyanate salts thereof.

SUMMARY OF THE INVENTION

Briefly, according to this invention, it has been discovered that cephaloridine or related cephalosporin $C_A$ compounds can be purified more directly from cephaloridine or cephalosporin $C_A$ compound hydrothiocyanate salt reaction mixture by adding a filter aid and a non-oxidizing mineral acid to the cephaloridine reaction mixture in a quantity sufficient to lower the pH to the range of 2.8 to about 3.5, stirring the mixture for about 0.25 to about 0.75 hour, separating filterable material which forms, and then continuing the acid addition to pH 1 to 1.5 to crystallize the cephaloridine, or other cephalosporin $C_A$ compound hydrothiocyanate salt from the solution thereof. By so conducting this portion of the process, I have discovered unexpectedly that the usual intermediate aqueous cephaloridine crystallization step can be eliminated, thereby enhancing the net efficiency of the process.

DETAILED DESCRIPTION OF THE INVENTION

The process improvement of this invention may be practiced in processes for making a wide variety of water soluble cephalosporin $C_A$ type compounds from the corresponding cephalosporin C type compounds. Examples of cephalosprin $C_A$ compounds which can be prepared involving this invention are those described in the above-mentioned Flynn patent. Cephalosporin C type compounds which can be used as starting materials for preparing cephalosporin $C_A$ compounds are also described in numerous prior art patents, among which are U.S. Pats. 3,218,318 and 3,225,038.

The compounds ultimately obtained by way of the present invention are the 7-acylamido-3-pyridinomethyl-3-cephem-4-carboxylic acid inner salts represented by the following formula:

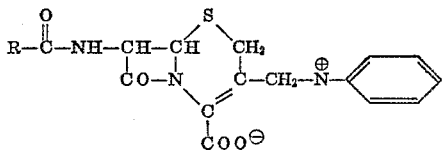

(I) where

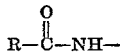

is acylamido, R being an organic radical. Also included within the scope of this invention are the hydrothiocyanic acid addition salts of the above amine bases.

The art now recognizes a wide range of acylamido groups, R—CO—NH—, at the 7-position of the cephalosporanic acid molecule and this part of the molecule is not directly concerned with the process of the present invention, which relates to the preparation of the so-called cephalosporin $C_A$ compounds, having the pyridinomethyl substituent in the 3 position rather than the acetoxymethyl substituent of the cephalosporin C compounds. Illustratively, however, the new process affords cephalosporin $C_A$ compounds wherein R has the structure:

$$R^1—(CH_2)_n—$$

where $R^1$ is hydrogen, $C_1$-$C_7$ alkyl, $C_1$-$C_7$ alkoxy, $C_1$-$C_7$ alkylmercapto, phenyl, phenoxy, phenylmercapto, thienyl, furyl, benzothienyl, or benzofuryl, and $n$ is 0 or 1.

Additionally, the art also recognizes a wide range of cephalosporin $C_A$ compounds bearing a pyridinomethyl substituent at the 3 position, the pyridine ring beng either unsubstituted or bearing one or more of a variety of substituents. Such substituents on the pyridine ring have no bearing upon the process of the present invention, and may thus vary widely in nature. A preferred group of compounds, from the pharmaceutical standpoint, includes unsubstituted pyridine and pyridine having, at the 3 or 4 position, a substituent selected from the group consisting of methyl, ethyl, hydroxy, hydroxymethyl, trifluoromethyl, halo, cyano, carboxy, carbo($C_1$-$C_4$)alkoxy, ($C_1$-$C_4$) alkanoyl, ($C_1$-$C_4$)alkanoyloxy, and

$R^2$ being hydrogen, methyl, ethyl, or cyclopropyl, and $R^3$ being hydrogen, methyl, or ethyl.

The radicals referred to above are illustrated as follows:

$C_1$-$C_7$ alkyl refers broadly to primary, secondary, and tertiary alkyl, of both straight-chain and branched-chain configuration, including methyl, ethyl, n-propyl, iso- propyl, n-butyl, sec.-butyl, tert.-butyl, n-amyl, isoamyl, 2-amyl, 3-amyl, neopentyl, n-hexyl, n-heptyl, isoheptyl, 3-heptyl, 2-methylhexyl, and the like.

$C_1$-$C_7$ alkoxy refers to $C_1$-$C_7$ alkyl-O-groups wherein alkyl is as defined above.

$C_1$-$C_7$ alkylmercapto refers to $C_1$-$C_7$ alkyl-S-groups wherein alkyl is as defined above.

Thienyl, benzothienyl, furyl, and benzofuryl groups may be attached at either the $\alpha$ or $\beta$ position.

Carbalkoxy refers to carbomethoxy, carbethoxy, carbopropoxy, carbo-n-butoxy, carbo-sec.-butoxy, carbo-tert.-butoxy, and the like.

Alkanoyl refers to acetyl, propionyl, butylryl, isobutyryl, and the like.

Alkanoyloxy refers to acetoxy, propionoxy, n-butyroxy, isobutyroxy, and the like.

The carbamyl group

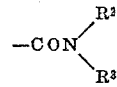

may be substituted, mono-substituted, or di-substituted, as defined, and in the di-substituted embodiments, the substituents may be the same or different. Thus, illustratively, the carbamyl group may be —$CONH_2$.

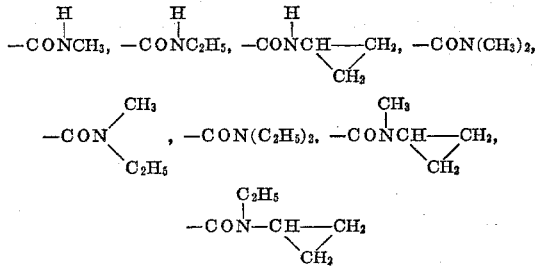

and the like.

While the compounds prepared by the improved process of the present invention have been defined in terms of a structural formula which depicts the structural features of the compounds and which indicates the presence therein of certain well-known organic radicals, including alkyl, cycloalkyl, phenyl, thienyl, benzothienyl, furyl, and benzofuryl, it will be recognized by those skilled in the art that such radicals may bear one or more substituents without departing in any way from the spirit of the invention and without altering the properties of the compounds in such a way as would prevent their preparation by the novel process herein described. Compounds having the structuure represented by Formula I, supra, and bearing such substituents are accordingly to be considered as equivalents of the unsubstituted compounds and are to be considered preparable by the novel process of the invention. Among such substituents, atoms, and radicals are halo, hydroxy, nitro, loweralkyl, trifluoromethyl, methoxy, methylmercapto, cyano, hydroxymethyl, $\beta$-hydroxymethyl, acetyl, acetamido, and the like.

The compounds produced by the present invention are antibiotic substances which are highly effective against such organisms as penicillin-resistant *Staphylococcus aureus*, the hemolytic streptococci, and a variety of gram-negative pathogens such as *Shigella sonnei, klebsielle penumoniae, Aerobacter aerogenes*, and the like.

The improved process of this invention will be described further in terms of cephaloridine production, although it is to be understood that the improved process may be applied to the purification of any cephalosporin $C_A$ compound which is made by processes involving the use of thiocyanate ions therein.

For comparison purposes, a brief flow sheet description of the steps involved in producing cephaloridine by presently known methods is provided, as well as similar flow sheet description of the step involved in the improved process of this invention.

The known process proceeds as follows:

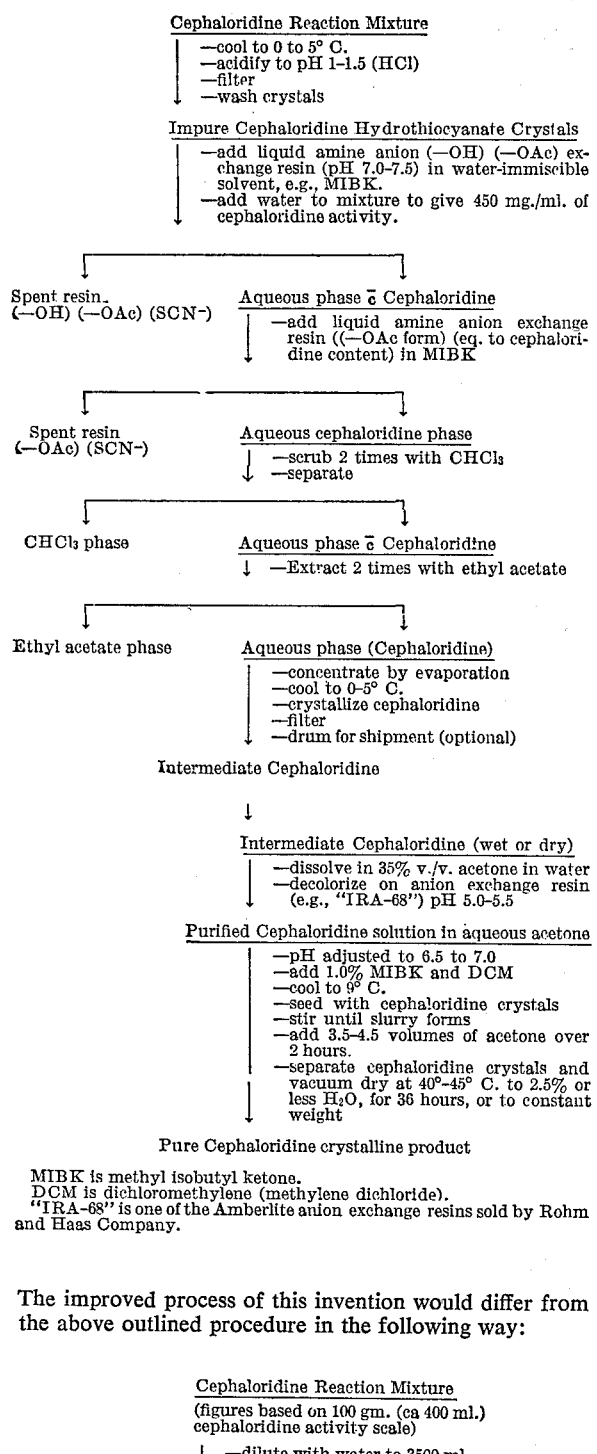

MIBK is methyl isobutyl ketone.
DCM is dichloromethylene (methylene dichloride).
"IRA-68" is one of the Amberlite anion exchange resins sold by Rohm and Haas Company.

The improved process of this invention would differ from the above outlined procedure in the following way:

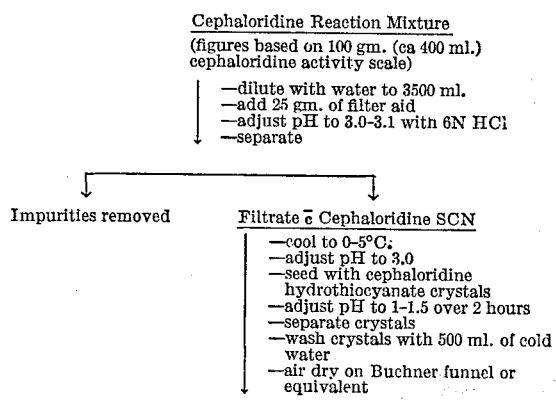

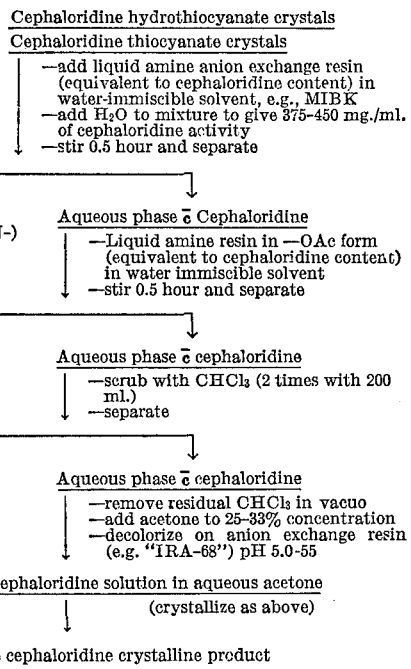

In summary, the prior process precipitates and works with impure cephaloridine hydrothiocyanate crystals, and involves the formation and use of an intermediate cephaloridine crystallization step. According to this invention, the acid precipitatable impurities in the cephaloridine hydrothiocyanate reaction mixture are removed first, leaving the cephaloridine hydrothiocyanate in solution for the time being. Thereafter the cephaloridine hydrothiocyanate salt is precipitated in a purity state which obviates the intermediate aqueous crystallization step heretofore used by prior purification processes.

In assisting the removal of the impurities from the cephaloridine hydrothiocyanate product reaction mixture, it is desirable to include the use of a filter aid to adsorb and absorb or otherwise hasten the separation of the undesired, frequently gum-like impurities from the cephaloridine activity in solution, although it is not essential to use a filter aid in this process. Examples of filter aids which may be used include diatomaceous earth, maleic anhydride/ethylene copolymers modified by partial amidation of carboxylic acid groups thereof, and commercially available materials such as "Celite 545" which is a trade name of Johns-Manville Co. for graded silica and diatomaceous earth filter aids. If used, a filter aid is added in an amount equivalent by weight to about 20 to 30 weight percent of the cephalosporin $C_A$ compound activity in the reaction mixture.

The liquid amine anion exchange resins which can be used in the improved process of this invention are known in the art. Examples of some of such resins are described, for example, in the above-mentioned Jackson et al. U.S. Pat. No. 3,577,412. The "IRA-68" and "IRA-124" resins recited in the examples are examples of resins available to treat solutions to remove or exchange anions and cations respectively. The "Amberlite IRA-68" resin is a weakly basic polyamine functional anion exchanger made by Rohm and Haas having a high porosity gel copolymer matrix of acrylic acid and divinyl benzene. Resins of this type are described, e.g. in Higgins, Jr. et al. U.S. Pat. No. 3,352,859, above cited. The "Amberlite IRA-124" resin mentioned herein is a strongly acidic sulfonic acid functional cation exchanger made by Rohm and Haas Company having a gel copolymer matrix of styrene and divinyl benzene.

It is also contemplated that this invention can be used in conjunction with the production of cephalosporin $C_A$ compounds such as cephaloridine in reaction mixtures wherein a portion of the thiocyanate ion content of the reaction mixture had been replaced by halogen ions such as chloride, bromide, or iodide ions provided to the reaction mixture as an alkali metal or alkaline earth metal salt such as the potassium, sodium, lithium, calcium or magnesium chloride, bromide or iodide salts. In such processes, however, enough thiocyanate is present in the mixture to precipitate the cephaloridine or other cephalosporin $C_A$ compound substantially as the hydrothiocyanate salt.

The invention is further illustrated by the following detailed example, which is not intended as limiting the scope of the invention.

EXAMPLE

This example illustrates the improved process of this invention applied to a process for the preparation of cephaloridine. All figures are scaled to start with 1 kg. of sodium cephalothin.

Resin column preparation ("IRA-68")

The anion exchange resin (new or regenerated) is slurried in water and slowly adjusted to pH 7.0–7.5 with glacial acetic acid. The resin is then poured into an appropriate vessel or column that will give at least a 4 ft. bed depth (assuming 1 in. in diameter) and washed with 2 liters of 35 percent acetone in water, by volume, after which the column is ready for use.

Liquid resin (acetate form) preparation

To 822 ml. of new liquid anion exchange resin (Rohm and Haas "Amberlite LA-1"), is added 106 ml. of glacial acetic acid, 2450 ml. of chloroform and 445 ml. of water. The mixture is stirred for 10 minutes and then the aqueous and organic phases are allowed to separate for several hours. The lower phase containing the liquid resin in the acetate form (LA-1 acetate) is separated and set aside until required.

Preparation of cephaloridine

A weight of intermediate sodium cephalothin (usually having a UV purity of 90–92%) equal to 1.0 kg. of pure sodium cephalothin is added to a suitable (e.g., glass, unchipped enamel or polyethylene) agitator-equipped vessel of 6 to 7 liter capacity along with 1 liter of water, 4 kg. of potassium thiocyanate, 250 ml. of pyridine and 25 ml. of conc. phosphoric acid. While stirring, the resulting mixture is heated rapidly to 60° C., and maintained at 58–62° C. for 5 hours.

The resulting reaction mixture is transferred to a bigger corrosion resistant vessel and diluted to 35 liters with water. Then 350 ml. of methyl isobutyl ketone and 250 gm. of a filter aid such as "Celite 545" are added. The pH of the resulting mixture is adjusted to 3.0–3.1 with 6 N hydrochloric acid. The mixture is cooled to 10° C. while stirring for about 30 minutes and then filtered to remove the precipitate and filter aid.

The filtrate is cooled to 5–10° C. with stirring. The pH is adjusted slowly to 2.5 with 6 N hydrochloric acid. When it is certain that crystallization of cephaloridine hydrothiocyanate salt has begun, the pH is finally adjusted with 6 N hydrochloric acid to 1.5. Cooling is continued to 0° C. The insoluble cephaloridine hydrothiocyanate salt is filtered and washed with 8 liters of chilled (0–5° C.) water. The salt cake can then be dried, if desired. Samples are taken to determine purity and color.

The cephaloridine hydrothiocyanate salt is placed in a suitable vessel, preferably glass, of 6 liter capacity. About 1.15 liters of water for each kilogram of cephaloridine activity is added to the vessel, and then while stirring a mixture of 1.1 liters of liquid anion exchange resin (Rohm and Haas LA-1 resin) in 3 liters of chloroform for each kilogram of cephaloridine activity is added. The mixture is stirred for about 20 minutes after which the phases are allowed to separate for about 20 minutes. The lower chloroform/liquid anion exchange resin (LA-1) phase is removed and held for regeneration. The upper aqueous phase containing cephaloridine is optionally treated again with a chloroform solution containing about 0.5 liter of liquid anion exchange (OH− form) resin to further purify the aqueous cephaloridine solution. The concentrated cephaloridine solution is scrubbed at least two times with a half volume of chloroform and the residual chloroform removed by vacuum concentration.

The aqueous cephaloridine concentrate is diluted with approximately 0.4 volume of acetone to a desired concentration of 400–425 mg./ml. This concentrate is then contacted with 100 ml. of "Amberlite IR–124" (H+ form) cation exchange resin batchwise for 20–30 minutes. The resin is filtered and the resulting solution is passed over an "IRA–68" anion exchange resin column containing 1.40 liters of resins for each kilogram of cephaloridine activity in the solution in 1 to 1.5 hours. After all of the cephaloridine solution has been added to the column, 50 percent acetone in water is passed through the column and collected with the cephaloridine solution until a total volume of 1830 ml. is obtained. For the subsequent aseptic acetone crystallization step, the composite anion exchange resin "IRA–68" column effluent is transferred through a sterilizing filter to a suitable sterile crystallization vessel (about 13 liter capacity). If the pH of the resulting solution is over 7.0, the pH is adjusted to 7.0 wth acetic acid. If the pH is under 6.5, the pH is adjusted to 6.5–7.0 with triethylamine. Then 1 percent by volume each of methyl isobutyl ketone and methylene chloride are added. The mixture is stirred and cooled to about 9° C. Cephaloridine seed, from prior batches, is added and the mixture is stirred until crystal slurry forms. Then 3.5 to 4.5 volumes of acetone per volume of cephaloridine slurry are slowly added over a 1.5 to 2 hour period. The mixture is cooled to 0–5° C. and filtered. Mother liquor is recycled for both solvent recovery and additional cephaloridine yield. The cephaloridine filter cake is washed with 1800 ml. of cold 90 percent acetone/water mixture and then with cold 100 percent acetone. The cephaloridine cake is then dried under vacuum at 40° C.

The following figures summarize the pH, O.D. (color) and processing yields of cephaloridine obtained by the process of this invention in two such runs, starting with cephaloridine hydrothiocyanate salt, wherein the average yield was 64 percent. The figures which follow are derived from 100 g. of cephaloridine activity in the cephaloridine hydrothiocyanate salt.

TABLE

| | Yields | | | pH, OD values | | | |
|---|---|---|---|---|---|---|---|
| Run | Post "LA-I", percent yield (step/cum.) | Post IR-124 "IRA-68", percent yield (step/cum.) | Final crystals, percent yield (step/cum.) | pH at "IRA-68" col. pre/post | OD at 410 mµ, pre-"IRA-68" | 10% conc. at post-"IRA-68" | Final crystals |
| 1 | 93.8/60.1 | 93.8/56.3 | 94.6/53.2 | 4.1/6.3 | 0.50 | 0.19 | 0.12 |
| 2 | 93.4/59.8 | 93.2/55.7 | 91.0/50.7 | 4.1/6.6 | 0.41 | 0.14 | 0.09 |

Note.—"LA-I" is a liquid anion exchange resin soluble in organic solvents such as chloroform, methylene chloride, carbon tetrachloride, sold by Rohm and Haas Company under the tradename "Amberlite LA-I"; IR-124, IR-68 are described above.

I claim:
1. In the process for preparing a water-soluble 7-acylamido-3-pyridinomethyl-3-cephem-4 - carboxylic acid wherein the 7-acylamido substituent is

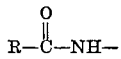

in which R is $R^1$—$(CH_2)_n$, wherein $R^1$ is hydrogen, $C_1$-$C_7$ alkyl, $C_1$-$C_7$ alkoxy, $C_1$-$C_7$ alkylmercapto, phenyl, phenoxy, phenylmercapto, thienyl, furyl, benzothienyl or benzofuryl; $n$ is 0 or 1 and wherein pyridino is selected from the group consisting of unsubstituted pyridino and pyridino having at the 3 or 4 position a substituent selected from the group consisting of methyl, ethyl, hydroxy, hydroxymethyl, trifluoromethyl, halo, cyano, carboxy, carbo($C_1$-$C_4$)alkoxy, ($C_1$-$C_4$)alkanoyl, ($C_1$-$C_4$)alkanoyloxy, and a carbamoyl group

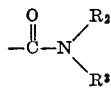

wherein $R^2$ is hydrogen, methyl, ethyl or cyclopropyl and $R^3$ is hydrogen, methyl or ethyl, which comprises reacting an impure 7-acylamidocephalosporanic acid, or a sodium or potassium salt thereof, wherein the 7-acylamido substituent is defined as above, with pyridine or a substituted pyridine as defined above, in the presence of thiocyanate ions in an aqueous medium at a pH between pH 6 and pH 7.5 at a temperature of about 55 to 70° C. for from about 4 to 6 hours and acidifying said reaction mixture with a non-oxidizing mineral acid to a pH between pH 1 to pH 1.5 to precipitate said 7-acylamido-3-pyridinomethyl-3-cephem-4-carboxylic acid as the hydrothiocyanate salt, the improvement which comprises initially acidifying said reaction mixture with a non-oxidizing mineral acid to a pH between about pH 2.8 and 3.5, stirring the acidified mixture for about 0.25 to about 0.75 hour, separating the precipitate of insoluble impurities and further acidifying said mixture to a pH between about pH 1 and pH 1.5 to precipitate the purified 7-acylamido-3-pyridinomethyl-3-cephem - 4 - carboxylic acid hydrothiocyanate salt.

2. A process improvement as defined in claim 1 wherein a crude alkali metal cephalothin salt is reacted with pyridine in a pH 6.5–7.2 aqueous medium, containing an alkali metal thiocyanate for about 5 hours at 58–62° C. to form cephaloridine, and the cephaloridine containing reaction mixture is treated with a non-oxidizing mineral acid to adjust the pH to 2.8 to 3.5, the mixure is stirred and filtered to remove filterable material, and then additional acid is added to adjust the pH to 1 to 1.5 to precipitate cephaloridine hydrothiocyanate.

3. A process as defined in claim 1 wherein a filter aid is added to the cephaloridine hydrothiocyanate product reaction mixture before the acid is added thereto to precipitate impurities.

References Cited
UNITED STATES PATENTS
3,577,412   5/1971   Jackson et al. _____ 260—243 C NICHOLAS S. RIZZO, Primary Examiner U.S. Cl. X.R.
424—246